United States Patent
Le Scouarnec et al.

(10) Patent No.: US 10,834,313 B2
(45) Date of Patent: Nov. 10, 2020

(54) PLENOPTIC SUB APERTURE VIEW SHUFFLING WITH IMPROVED RESOLUTION

(71) Applicant: INTERDIGITAL CE PATENT HOLDNGS, Paris (FR)

(72) Inventors: Nicolas Le Scouarnec, Liffre (FR); Arno Schubert, Chevaigne (FR); Valter Drazic, Betton (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 130 days.

(21) Appl. No.: 16/314,581

(22) PCT Filed: Jun. 27, 2017

(86) PCT No.: PCT/EP2017/065914
§ 371 (c)(1),
(2) Date: Dec. 31, 2018

(87) PCT Pub. No.: WO2018/002089
PCT Pub. Date: Jan. 4, 2018

(65) Prior Publication Data
US 2019/0158736 A1 May 23, 2019

(30) Foreign Application Priority Data

Jun. 30, 2016 (EP) ..................... 16305821

(51) Int. Cl.
*G06K 9/32* (2006.01)
*H04N 5/232* (2006.01)
(Continued)

(52) U.S. Cl.
CPC .......... *H04N 5/23232* (2013.01); *G06T 3/40* (2013.01); *G06T 5/50* (2013.01); *H04N 5/2254* (2013.01);
(Continued)

(58) Field of Classification Search
None
See application file for complete search history.

(56) References Cited

U.S. PATENT DOCUMENTS

| | | | |
|---|---|---|---|
| 5,369,266 A | 11/1994 | Shigetoshi et al. | |
| 8,582,015 B2 * | 11/2013 | Katsuda | G02B 5/3083 |
| | | | 348/335 |

(Continued)

FOREIGN PATENT DOCUMENTS

| | | |
|---|---|---|
| CN | 102906616 A | 1/2013 |
| JP | H09130818 | 5/1997 |

(Continued)

OTHER PUBLICATIONS

Lei et al., "An electrically tunable plenoptic camera using a liquid crystal microlens array." Review of scientific instruments 86, No. 5, May 15, 2015. (Year: 2015).*

(Continued)

*Primary Examiner* — Feng Niu
(74) *Attorney, Agent, or Firm* — Lily Neff (57) ABSTRACT

A system and method for generating high resolution images using a plenoptic camera having a main lens in front of an array of microlenses and an image sensor, characterized in that it comprises: capturing a first set of images in a first unexcited state of operation by using a birefringent medium disposed between a said main lens and an said array of microlenses, said unexcited state of said birefringent medium providing an ordinary ray to each pixel; causing said first unexcited state to become a second excited state by applying a voltage across said birefringent medium; capturing a second set of images in said second excited state, said excited state of said birefringent medium splitting the light from said main lens into an ordinary ray and an extraordinary ray, said extraordinary ray being shifted by a distance of one half-pixel from the ordinary ray on said image sensor;

(Continued)

subtracting pixel value associated with said first set of images from at least two times the pixel value associated with said second set of images, and generating a final set of images with high resolution from said subtraction and said first set of images.

15 Claims, 4 Drawing Sheets

(51) Int. Cl.
      *H04N 5/225*       (2006.01)
      *H04N 9/07*        (2006.01)
      *H04N 13/232*       (2018.01)
      *H04N 13/296*       (2018.01)
      *G06T 3/40*        (2006.01)
      *G06T 5/50*        (2006.01)

(52) U.S. Cl.
      CPC ........... *H04N 5/22541* (2018.08); *H04N 9/07* (2013.01); *H04N 13/232* (2018.05); *H04N 13/296* (2018.05); *G06T 2207/10052* (2013.01); *G06T 2207/20224* (2013.01)

(56) References Cited

U.S. PATENT DOCUMENTS

| | | | |
|---|---|---|---|
| 9,293,491 B2* | 3/2016 | Kanamori | G02B 23/24 |
| 9,557,856 B2* | 1/2017 | Send | G01S 7/499 |
| 10,012,532 B2* | 7/2018 | Send | G01S 17/04 |
| 10,048,130 B2* | 8/2018 | Lambert | G01J 3/0208 |
| 2011/0001866 A1 | 1/2011 | Yasutoshi et al. | |
| 2013/0270421 A1 | 10/2013 | Katsuhiro et al. | |
| 2018/0328786 A1* | 11/2018 | Lambert | G01J 3/0208 |

FOREIGN PATENT DOCUMENTS

| | | |
|---|---|---|
| KR | 20140061234 A | 5/2014 |
| KR | 1020140061234 | 5/2014 |

OTHER PUBLICATIONS

EP Search Report for EP16305821_dated_Dec. 5, 2015.
ISR_for_PCT/EP2017/065914 dated Sep. 6, 2017.

* cited by examiner

PLENOPTIC SUB APERTURE VIEW SHUFFLING WITH IMPROVED RESOLUTION

This application claims the benefit, under 35 U.S.C. § 365 of International Application PCT/EP17/065914, filed Jun. 27, 2017, which was published in accordance with PCT Article 21(2) on Jan. 4, 2018 in English and which claims the benefit of European patent application 16305821.7, filed Jun. 30, 2016

TECHNICAL FIELD

The present disclosure relates generally to digital image processing and more particularly to plenoptic imaging techniques using demosaicing.

BACKGROUND

This section is intended to introduce the reader to various aspects of art, which may be related to various aspects of the present invention that are described and/or claimed below. This discussion is believed to be helpful in providing the reader with background information to facilitate a better understanding. Accordingly, it should be understood that these statements are to be read in this light, and not as admissions of prior art.

Photography creates durable images by recording light or other electromagnetic radiation. Images are captured electronically by means of an image sensor or chemically by means of a light-sensitive material. In regular cameras, a lens is used to focus the light reflected or emitted from objects into a real image on the light-sensitive surface, inside a camera during a timed exposure. With an electronic image sensor, an electrical charge is produced at each pixel, which is then processed and stored in a digital image file for further use. In classic photography, the focal surface is approximately a plane or focal plane. The focal surface is perpendicular to the optical axis of the camera and the depth of field is constant along the plane. By contrast, in a plenoptic camera, each micro-image depicts an area of the captured scene and each pixel associated with that micro-image shows this certain area from the point of view of a certain sub-aperture location on the main lens exit pupil. The raw image of the scene is then obtained as a result of the sum of all the micro-images and the raw image contains the angular information of the light-field. Consequently, neighbor pixels in a raw image contain different angular information as each pixel corresponds to a different view.

A plenoptic camera uses a micro lens array that is positioned in the image plane of a main lens and before an array of photo sensors onto which one micro-image (also called sub-image) is projected. By placing a micro lens array between the main lens and the sensor, a plenoptic camera captures the direction of the light bundles that enter the camera, in addition to their position, intensity and color. Captured data is then demultiplexed to provide a matrix of horizontally and vertically aligned views from slightly different points of view over the scene. Consequently, each micro-image depicts an area of the captured scene and each pixel associated with that micro-image shows this certain area from the point of view of a certain sub-aperture location on the main lens exit pupil. The raw image of the scene is then obtained as a result of the sum of all the micro-images acquired from respective portions of the photo-sensors array.

The recent release of hand held plenoptic cameras have introduced the potential of light field imaging to the mass market. This new capability have suddenly increased the interest in introducing a number of light fields applications. Some popular applications have included those that concentrate on depth estimation or post-capture refocusing. Raw data conversion is complex and involve several issues that need to be resolved. One such issue involves issues with providing superior resolution. Consequently, there is a need for improved techniques that can provide better image resolution of using captured raw data.

SUMMARY

Additional features and advantages are realized through the techniques of the present disclosure. Other embodiments and aspects of the invention are described in detail herein and are considered a part of the claimed invention. For a better understanding of the invention with advantages and features, refer to the description and to the drawings.

A system and method for generating high resolution images using a plenoptic camera, is provided. In one embodiment, the comprises capturing a first set of images in a first unexcited state of operation by using a birefringent medium disposed between a main lens and an array of lenses having a plurality of apertures. Each pixel of the first set of images is then mapped to a first set of apertures. The first unexcited state is then caused to become a second excited state by applying a voltage across said birefringent medium. A second set of images are captured in the second excited state and a second set of pixels of the second image is mapped to a second set of apertures. A value is calculated for each first and second set of images and the value associated with said first set of images is subtracted from at least two times the value calculated from said second set of image.

BRIEF DESCRIPTION OF THE DRAWINGS

The present disclosure will be better understood and illustrated by means of the following embodiment and execution examples, in no way limitative, with reference to the appended figures on which.

In FIGS. 1-4, the represented figures provide examples that are purely functional entities and do not necessarily correspond to physically separate entities. Namely, they could be developed in the form of software, hardware, or be implemented in one or several integrated circuits, comprising one or more processors.

Wherever possible, the same reference numerals will be used throughout the figures to refer to the same or like parts.

DESCRIPTION

It is to be understood that the figures and descriptions of the present invention have been simplified to illustrate elements that are relevant for a clear understanding of the present invention, while eliminating, for purposes of clarity, many other elements found in typical digital multimedia content delivery methods and systems. However, because such elements are well known in the art, a detailed discussion of such elements is not provided herein. The disclosure herein is directed to all such variations and modification.

Figure 1:
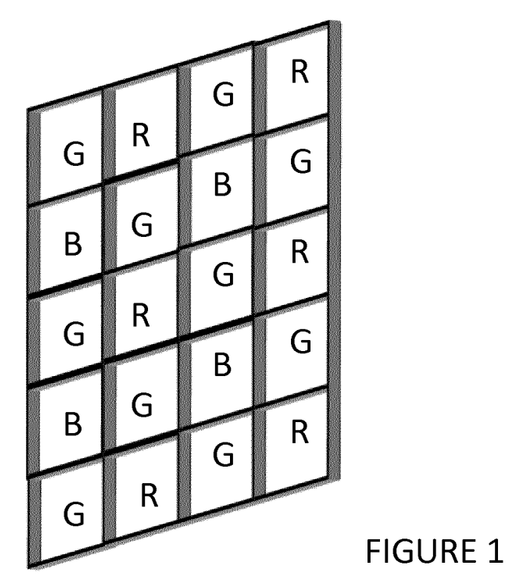
FIG. 1 is a block diagram showing a color filter array (CFA) used in a demosaicing process.

FIG. 1, is prior art depiction of a plenoptic micro-image matrix using a color filter array (CFA) used in a demosaicing process. Demosaicing, as known by those skilled in the art, is a technique for processing digital images by reconstructing incomplete color sample output from an image sensor overlaid with a filter such as CFA used in FIG. 1. Color filter arrays are used in demosaicing processes are digital image processing techniques that use a color filter array to reconstruct a full color image from incomplete color samples. The color samples are often an output of one or more image sensors overlaid with a CFA. A color filter array is a mosaic of color filters in front of one or more image sensors. Commercially, the most commonly used CFA configuration is the Bayer filter. The prior art example of FIG. 1 provides an example of such a filter. As shown, the alternating red (R) and green (G) filters for odd rows, are further alternated in even rows with intervening rows that include interspersed green (G) and blue (B) filters. This is because the Bayer pattern is a periodic pattern with a period of two different color pixels in each dimension (vertical and horizontal). In the horizontal direction, a single period includes either a green pixel and a red pixel, or a blue pixel and a green pixel. In the vertical direction, a single period includes either a green pixel and a blue pixel, or a red pixel and a green pixel.

The final result, such as in this example, there are twice as many green filters as red or blue ones, catering to the human eye's higher sensitivity to green light. The color sub-sampling of a CFA by its nature results in aliasing, and therefore optical anti-aliasing filters are placed in the optical path between the image sensor and the lens to reduce the false color artifacts (chromatic aliases) introduced by interpolation. Since each pixel of the sensor is behind a color filter, the output is an array of pixel values, each indicating a raw intensity of one of the three filter colors. The Bayer filter is an example of a CFA that uses a multivariate interpolation on a uniform grid. Thus, an algorithm is needed to estimate for each pixel the color levels for all color components, rather than a single component. Conventional demosaicing algorithm reconstruct a full color image from such spatially under sampled color channels output from the CFA or other filters.

Figure 2A:
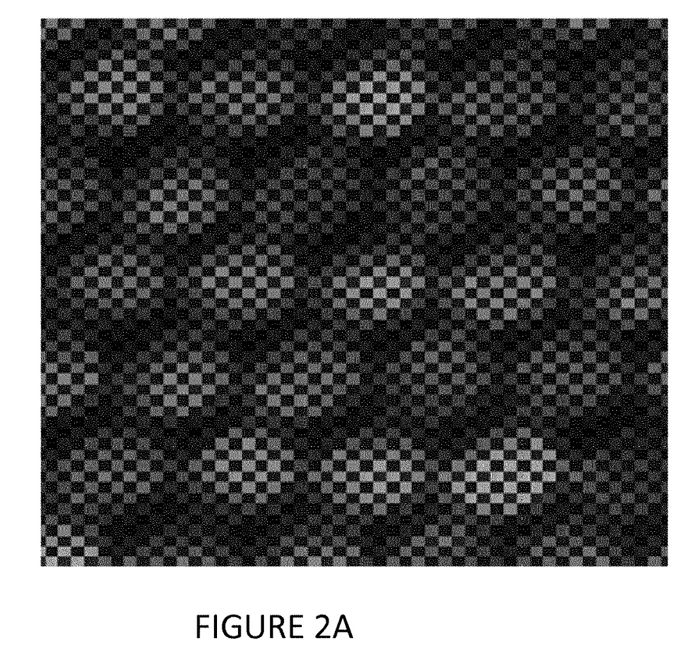
FIG. 2A is a depiction of plenoptic micro images captured with a color filter array (CFA) pattern.

The mathematical operations involved in such algorithms is simple as it is based on nearby instances of the same color component. The simplest method of such interpolation algorithm relies on the nearest-neighbor interpolation which simply copies an adjacent pixel of the same color channel. However, such filters are unsuitable for any application where details and quality of image are important. In addition, although these methods can obtain good results in homogenous image regions, they are prone to severe demosaicing artifacts in regions with edges and details when used with pure-color CFAs. More sophisticated demosaicing algorithms exploit the spatial and/or spectral correlation of pixels within a color image but they are still problematic as will be seen in more details by referring to FIG. 2B. FIG. 2A is an exemplary embodiment illustrating micro-images captured by a plenoptic camera. Each pixel is illuminated by a sub-aperture of the exit pupil of the main lens. Due to the sampling through multiple lens, once the sub-aperture views are demultiplexed, the final images can have low resolution when compared to traditional imaging systems. These techniques will be discussed in more detail in conjunction with FIGS. 3 and 4, this resolution can be greatly enhanced without requiring any additional sensors. In FIG. 2A, the lighter shade represents green (G) while the darkest shade represent blue (B) and the medium gray shade represent the color red (R). In this example, each pixel is illuminated by a sub-aperture of the exit pupil of the main lens.

Figure 2B:
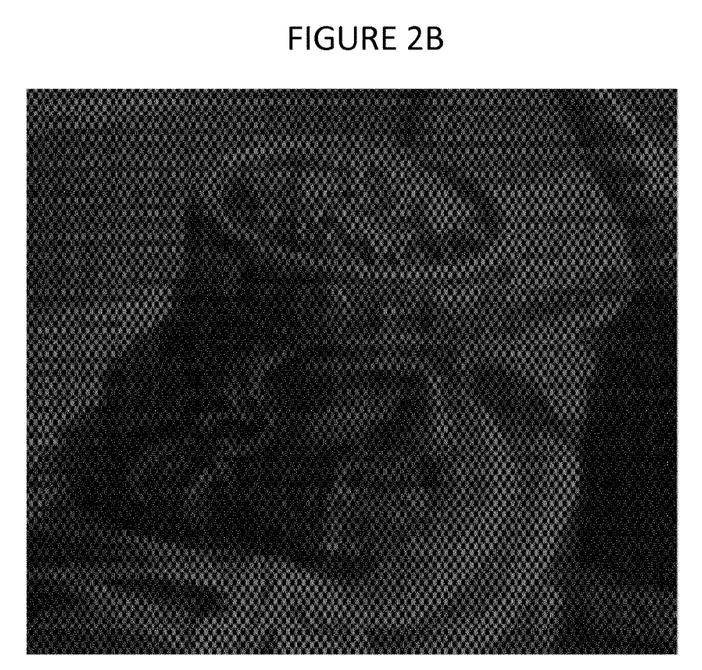
FIG. 2B is an illustration of a demultiplex image captured using a color filter and a micro lens array.

Due to the hexagonal sampling, the residual rotation between the lens and pixel grids and to the CFA, once the sub-aperture views are demultiplexed, the ensuing views may have information or color missing from it in some areas. In order to recover the missing portions of the views or objects in a scene, it is possible to demosaic the raw data obtained by a plenoptic camera and then demultiplex to recover the views. The problem is that in most instances, this leads to color artifacts on the views. Consider a case where a neighbor pixels construction is used on a plenoptic raw image that contains different angular information (each pixel under a microlens corresponds to a different view). Demosaicing the raw plenoptic image in this case will potentially wrongly mixes angular information. In traditional algorithm that interpolate neighbor color values creating the so-called view cross-talk artifacts, this causes erroneous results Furthermore, it has been shown in that disparity estimation from views obtained from the demosaiced raw image is prone to even larger errors. FIG. 2B is an illustration of a demultiplex image as discussed. In the illustrated example of FIG. 2B, a scene is provided with views or images of one or more objects. The image was captured by a plenoptic camera. Looking at the view of FIG. 2B, it is difficult to recognize the image in the scene being presented. The overall contours an object is visible in FIG. 2B, but there are not sufficient information provided in the image to allow for detailed object recognition. Even in instances where shade, intensity and colors are not totally missing, the complementary color information has to be interpolated from distant pixels which are problematic in most instances. This affects the resolution greatly. In FIG. 2B, the demosaiced image is still missing information, but the image is demultiplexed in the appropriate manner. Without demosaicing, the raw data requires to be demultiplexed into views of the scene, without being demosaiced. Increasing the resolution requires using higher resolution sensors which use smaller "cells", leading to poorer performance in low light and higher noise. However, even if additional sensor cells of such quality are used, this technique will soon encounter limitations. The present technique as will be discussed in conjunction with FIGS. 3 and 4, will provide a way to increase optical resolution so that any of the original sensors that have adequate to good performance can still be used with improved final resolution quality In one embodiment a medium is used that with the application of a voltage turns into a birefringence medium. Birefringence is the property of crystalline material that gives rise to production of two refracted rays when a ray hits them. This property is due to non isotropic distribution of atoms in the media and happens in crystalline media whose crystalline mesh structure is strongly non isotropic. Quartz and Calcite are natural material which exhibit birefringence. With those media, when a non polarized ray hits one of their surfaces which is at a special orientation, there are two rays that get created at refraction. One of these rays have one polarization characteristic and the other has a slightly different one. According to Snell-Descartes law: $n_i \sin \theta_i = n_r \sin \theta_r$ where $n_i$ and $n_r$ are the respective (and different) refractive indices of the incident and refracted medium and $\theta_i$ and $\theta_r$ are the incident and refracted angles.

Birefringent materials refract rays according to Snell's law but the effective index of refraction in the medial depends upon the input polarization state and the angle the refracted ray makes with respect to the crystal axis. In a birefringent materials, the two type of rays can be defined as ordinary and extraordinary. Ordinary rays are refracted according to the Snell's principle n sin $\theta$=$n_o$ sin $\theta'$, where "0" indicates the ordinary index.

In a birefringent media, the ray that obeys the Snell-Descartes law is called the ordinary ray and the medium has one ordinary index of refraction $n_o$. The second ray that is created undergoes another refraction $n_e$, it propagates in a direction within the material which has the extraordinary index $n_e$ and is polarized perpendicularly to the ordinary ray. In the birefringent medium, two rays are created with different propagation directions.

For extraordinary rays, in birefringent cases, the refraction law provides that n sin $\theta$=n ($\theta$w) sin $\theta'$, where the effective index of refraction in the birefringent materials is a function of the angle $\theta_w$. The angle $\theta_w$ is the angle between the crystal axis vector "a" and the refracted wave vector "k". Additionally, the ray vector "s", which is the vector pointing in the direction of energy propagation does not follow the wave vector "k", but makes small angles with respect to vector "k". In isotropic medial, vectors "k" and "s" are the same. Therefore, for most optical designs, vector "k" must be taken into consideration. In these cases, the angle $\theta_w$ is defined as:

$$\cos\theta_w = \hat{k}\cdot\hat{a}.$$

The effective index of refraction is defined by $$\left(\frac{1}{n(\theta_w)}\right)^2 = \left(\frac{\cos\theta_w}{n_o}\right)^2 + \left(\frac{\sin\theta_w}{n_e}\right)^2,$$

where $n_o$ is the ordinary and $n_e$ is the extraordinary index of refraction.

The angle $\alpha$ between $\hat{k}$ and $\hat{s}$ is defined by $$\cos\alpha = \hat{k}\cdot\hat{s}, \text{ where}$$

$$\tan\alpha = \frac{(n_e^2 - n_o^2)\tan\theta_w}{n_e^2 + (n_o\tan\theta_w)^2},$$

and the vectors $\hat{k}$ and $\hat{s}$ are both coplanar with the crystal axis vector $\hat{a}$. The wave vector $\hat{k}$ point long the normal to the wavefront, whiles points along the direction of energy propagation.

Figures 3A, 3B:
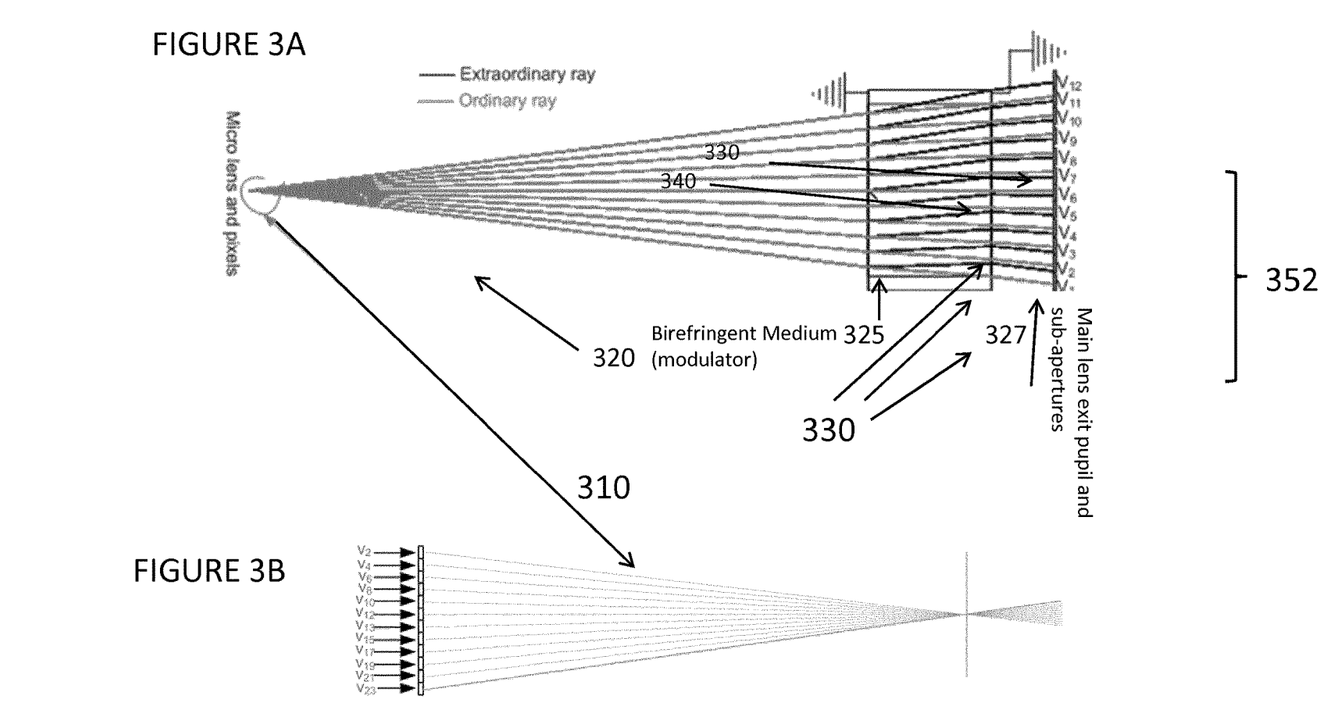
FIG. 3A is a depiction of a diagram for a sub-aperture to pixel mapping of both ordinary and extraordinary states according to one embodiment.
FIG. 3B is an illustration of a zoomed image, providing a more detailed pixel mapping of ordinary state as provided by the embodiment shown in FIG. 3A.

FIG. 3A illustrates a diagram for a sub-aperture to pixel mapping of both ordinary and extraordinary states. As shown, a plurality of rays (shown generally as 320) are passed through a medium shown by reference numerals 325. On the right hand side of the figure, there is the exit pupil of the main lens shown by reference numeral 327 generally. This main lens exit is further divided into sub apertures V1 to V12, as shown by reference numerals 352 collectively. In this embodiment, the medium 330 is electrically controllable. In one embodiment, a birefringent material is used but a variety of similar mediums are available as can be appreciated by those skilled in the art. In one example, to provide a birefringent medium one is used that incorporates twisted liquid crystals nematic (TN). The TN liquid crystal can be sandwiched between two glass plates having transparent Indium Tin Oxide (ITO) electrodes, in one embodiment. In one example, in its ground state, with no voltage applied to the TN cell, the sub-apertures are imaged each onto one sole pixel per micro image following the green lines which depicts the ordinary rays.

FIG. 3A shows one micro-lens and one column of the pixels show how the ordinary ray map each sensor pixel to two sub-aperture pixels (one corresponding to the ordinary ray, one corresponding to the extraordinary ray). To understand how things work with extraordinary rays, it is better to follow the blue rays (shown in darker shade) the other way round: from pixels to sub-apertures. When leaving one pixel, the extraordinary ray follows the blue path (dark gray in the Figure). It crosses the optical center of its microlens and then hits the birefringent cell 325. The cell is in its "extraordinary" state with an applied voltage and thus, this time, two rays are generated, the green which refracts as ordinary, and the blue one which refracts as the extraordinary ray. When both hit the exit pupil of the main lens, the ordinary ends up on one sub-aperture while the extraordinary ray maps into another sub-aperture. This means that if one begins from the exit pupil, in normal state, the ordinary ray of main sub-apertures (green v2-v12,v13-v23) will hit the sensor pixel and secondary sub-apertures are ignored dropped. In "extraordinary" state, a part of the light will come from the main sub-apertures (green or light gray in the Figures—as an ordinary ray) and another part of the light will come from the secondary sub-apertures (blue v1-v11-v14-v24). This allows to capture twice the resolution by reading the sensor with the modulator once in ordinary state and once in extraordinary state. Processing afterwards will recover the higher resolution image.

Figure 3C:
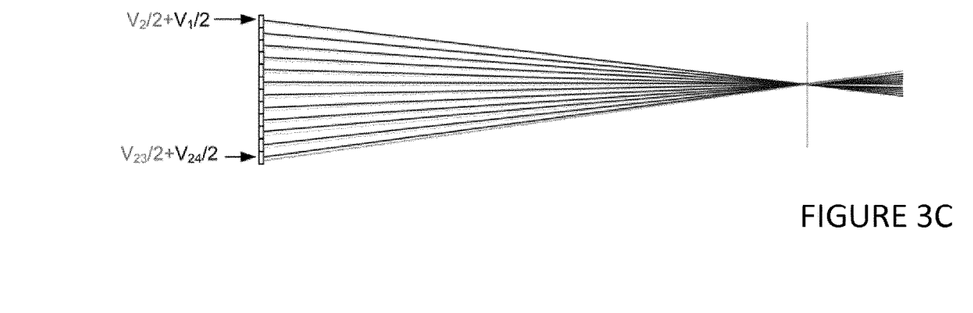
FIG. 3C is an illustration of a zoomed image, providing a more detailed pixel mapping of ordinary state as provided by the embodiment shown in FIG. 3A

FIGS. 3B and 3C each provide a more detail illustration of area 310 of FIG. 3A. More specifically, FIG. 3B shows the ordinary (green-light gray) rays in more detail, while FIG. 3C shows the extraordinary (blue or dark gray) rays in more detail. In this way, sub-aperture to pixel mapping of ordinary (green) and extraordinary states (blue) of FIG. 3A become more obvious by looking at the details provided in FIGS. 3B and 3C.

In the ordinary state, the pixels v1 to v11 are read, and pixels in between (e.g., v1/2+v2/2 . . . v11/2+v12/2) (rays not shown) fall in between sub-apertures. Adding resolution information to a plenoptic image requires two images to be taken sequentially. A first image is taken at t0 with the cell in the ordinary state. The pixels on the sensor do record the following states:

$P(t0,v2),P(t0,v4),P(t0,v6), \ldots ,P(t0,v12),P(t0,v13),P(t0,v15),P(t0,v17), \ldots ,P(t0,v23)$ A second image is taken at t1 with the cell in its extraordinary state. Two rays of equal intensities are generated if there is no polarizing phenomenon in the scene:

$P(t_0,v1)/2+P(t_0,v2)/2,P(t_0,v3)/2+P(t_0,v4)/2$

Thus,

If the first image is subtracted from the two times the second shot for pixels that are not borderline: it is possible as per one embodiment to recover v1,v24 hence reading 24 values with a sensor that only has 12 pixels.

Applying this concept to the rest of the pixels, if two scene shots are produced at t0 and t1, from these a linear combination of pixel values can be obtained that allows for two times more resolution information than usually provided using conventional methods. In one example, the additional component used in this system is twisted nematic (TN) cell.

The additional component used in this system is TN cell. The Liquid Crystal can have a big difference in value between the ordinary $n_0$ and extraordinary $n_e$ indices of refraction. In some cases, a LC mixture named MLC-9200-100 as known to those skilled in the art, for example can have $n_e - n_0 > 0.2$ which is a very big difference. In some embodiments, however, this is needed in order to reduce the thickness of the cell. This thickness has to be adjusted to become compatible with a placement of the cell between the micro-lens array and the sensor, and therefore any size reduction may be helpful (even if by a few mm) in certain applications.

Figure 4:
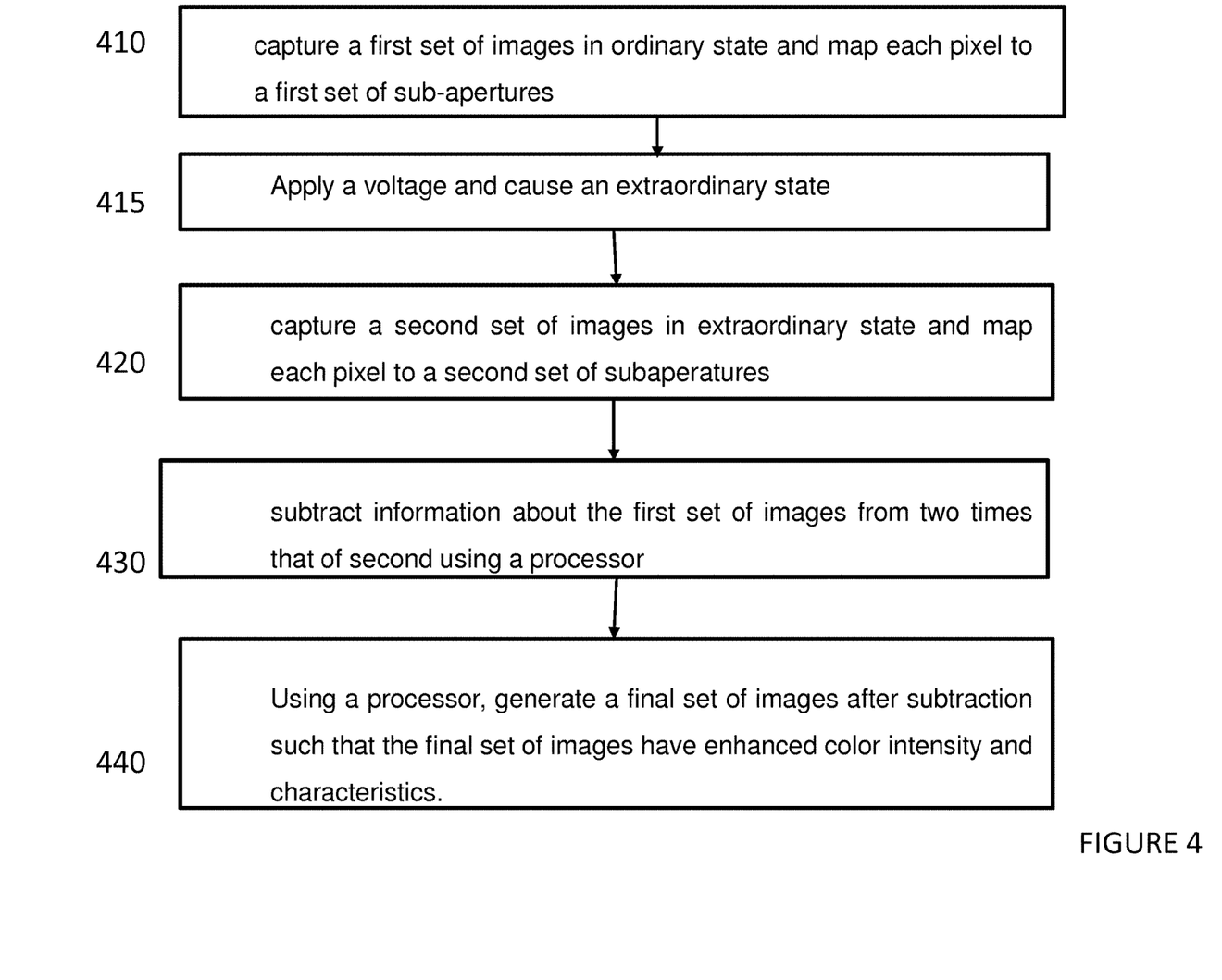
FIG. 4 is a flow chart depiction of the process in FIG. 3 according to one embodiment.

FIG. 4 is a flow chart depiction of the process explained above according to one embodiment. FIG. 4 illustrates the steps for a method of generating multiple images of different color intensity and characteristics using a plenoptic camera having a main lens disposed ahead of an array of lenses having a plurality of apertures. As shown in FIG. 4 at step 410, a first set of images are captured using a first state of an electro optical polarization modulator. In one embodiment, the modulator is disposed between said main lens and array of lenses with plurality of apertures. In step 420, a second set of images are captured using a second state of an electro optical polarization modulator. In step 430 the information about the second set of images is subtracted, such as for example with a configured processor, from information about the first set. In step 440, a final set of images are generated after the subtraction such that said final set of images have enhanced resolution. In one embodiment, a system for generating multiple images of different color intensity and characteristics can be used to conduct the method steps of FIG. 4 and the arrangement of FIGS. 3A and 3B. In this embodiment, a main lens (310) disposed in front of an array of lenses (352) associated with a plurality of apertures. An electrically controlled electro optical modulator (325) such as shown in FIG. 3A can be disposed between the micro lens and the array of lenses shown. The electro optical modulator functions between the two states (330 and 340 in FIG. 3A) upon application of an electrical voltage. The first set of images are then captured using the first state of an electro optical polarization modulator and a second set of images are also captured using a second state of an electro optical polarization modulator as discussed in conjunction with FIG. 4. Subsequently, a processor can be incorporated into the system that is configured to subtract information about said second set of images from information about the first set of captured images to generate (440 in FIG. 4) a final set of images with enhanced color intensity and characteristics. In this manner rich color information can be obtained, even in a very complicated situation, where a plenoptic camera delivers very sparse color information.

The invention claimed is:

1. A method of generating high resolution images using a plenoptic camera, comprising:
   capturing a first set of images in a first unexcited state of operation by using a birefringent medium disposed between a main lens and an array of lenses having a plurality of apertures;
   mapping each pixel of said first set of images to a first set of apertures;
   causing said first unexcited state to become a second excited state by applying a voltage across said birefringent medium;
   capturing a second set of images in said second excited state such that a second set of rays are generated;
   mapping each pixel of said second set of images to a second set of sub-apertures;
   calculating a value for said first set of images and second set of images;
   subtracting the value associated with said first set of images from at least two times the value calculated associated with said second set of images.

2. The method of claim 1, further comprising generating a final set of images after said subtraction step.

3. The method of claim 1, wherein said application of voltage across said birefringent medium causes two simultaneous set of rays to be generated that are mapped to different set of apertures.

4. The method of claim 3, wherein said two set of rays are green and blue respectively and some of the mapped apertures are shared.

5. The method of claim 1, wherein said second excited state returns to said first state in absence of electrical voltage.

6. The method of claim 1, wherein said application of voltage produces two simultaneous set of rays such that a first set is mapped into a first lower aperture and a second set is mapped into a second upper aperture.

7. The method of claim 1, wherein said second set of rays has a second angle of refraction different than said first set of rays.

8. The method of claim 7, wherein said first and second set of rays have a different index of refraction.

9. The method of claim 1, wherein said first and said second set of rays propagate in a different direction.

10. The method of any one of claim 1, wherein said first and second set of rays are being created with different propagation distances.

11. A system for generating multiple images of different color intensity and characteristics, comprising
    a main lens disposed in front of an array of lenses associated with a plurality of apertures;
    an electrically controlled medium disposed between said main lens and said array of lenses; said medium operating between a first unexcited state and a second excited state upon application of an electrical voltage;
    means for capturing and mapping a first set of images during said first unexcited state such that each pixel of said first set of images corresponds to a first set of apertures;
    means for capturing and mapping a second set of images in said second excited state such that each pixel of said second set of images corresponds to a second set of apertures;
    and
    a processor configured to calculating a value for pixels associated with said first set of images and second set of images; said processor also configured to subtract the value associated with said first set of images from at least two times the value calculated from pixels associated with said second set of image.

12. The system of claim 11, further wherein said application of voltage produces two simultaneous set of rays such that a first set is mapped into a first lower aperture and a second set is mapped into a second upper aperture.

13. The system of claim 12, wherein said first ray is green which refracts as associated with the first unexcited state and the second ray is blue which refracts as associated with the second excited state.

14. The system of claim 11, wherein said first and second set of rays are being created with different propagation distances.

15. The system of claim 14 wherein said first and said second set of rays propagate in different directions.

\* \* \* \* \*